(12) United States Patent
Kurian et al.

(10) Patent No.: US 6,737,481 B1
(45) Date of Patent: May 18, 2004

(54) ESTER-MODIFIED DICARBOXYLATE POLYMERS

(75) Inventors: Joseph V. Kurian, Hockessin, DE (US); Yuanfeng Liang, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/459,829

(22) Filed: Jun. 10, 2003

Related U.S. Application Data

(60) Provisional application No. 60/434,758, filed on Dec. 19, 2002.

(51) Int. Cl.⁷ ............................ C08F 20/00; C08G 63/66
(52) U.S. Cl. ................ 525/444; 528/279; 528/283; 528/293; 528/295; 528/295.3; 528/298; 528/299; 528/300; 528/302; 528/306; 528/308; 528/308.6; 525/437; 524/483
(58) Field of Search ................... 528/279, 283, 528/293, 295, 295.3, 298, 299, 300, 302, 306, 307, 308, 308.6; 525/437, 444; 524/783

(56) References Cited

U.S. PATENT DOCUMENTS

| | | |
|---|---|---|
| 5,912,307 A | 6/1999 | Paschke et al. |
| 5,958,581 A | 9/1999 | Khanarian et al. |
| 5,959,066 A | 9/1999 | Charbonneau et al. |
| 6,063,464 A | 5/2000 | Charbonneau et al. |
| 6,063,465 A | 5/2000 | Charbonneau et al. |
| 6,063,495 A | 5/2000 | Charbonneau et al. |
| 6,166,170 A | 12/2000 | Putzig |

OTHER PUBLICATIONS

DuPont Tyzor Organic Titanates, General Brochure (2001).
DuPont Tyzor Organic Titanates, Technical Note—Grade Chart (2001).
DuPont Tyzor Organic Titanates, Technical Note—Grade Selection Chart (2001).

*Primary Examiner*—Samuel A. Acquah

(57) ABSTRACT

A polymer comprising poly(alkylene-co-dianhydrosugar ester) dicarboxylate and its preparation by reacting an alkylene diol, terephthalic acid, and a moiety of formula 1

$$X\text{-}I_a\text{-}(A\text{-}I)^n\text{-}A_b\text{-}X \qquad \text{Formula 1}$$

wherein:
- A is the ester residue from an anhydrosugar alcohol or dianhydrosugar alcohol,
- I is the ester residue from a diacid or its dialkyl esters,
- X is H when linked to an A residue, OH when linked to an I residue derived from a dibasic acid, and OR when linked to an I residue derived from a dialkyl ester of the dibasic acid,
- R is a C1–C4 straight or branched chain alkyl group,
- a and b are independently 0 or 1, and
- n is 1 to 10 is disclosed.

26 Claims, No Drawings

ESTER-MODIFIED DICARBOXYLATE POLYMERS

RELATED U.S. APPLICATION

This application is a non-provisional of provisional U.S. application Ser. No. 60/434,758, filed Dec. 19, 2002, now pending.

FIELD OF THE INVENTION

This invention relates to copolymers of dibasic acids with dianhydrosugar alcohols and the incorporation of such copolymers in polyesters. The polyesters of the present invention provide important property improvements.

BACKGROUND OF THE INVENTION

Charbonneau et al. in U.S. Pat. No. 6,063,464 have shown that incorporation of dianhydrosugar alcohols, such as 1,4:3, 6-dianhydrosorbitol, hereinafter referred to by its trivial name "isosorbide", can significantly raise the glass transition temperature ($T_g$) of terephthalate polyesters, such as poly(1,3-propanediol terephthalate). Poly(1,3-propanediol terephthalate), also known as poly(trimethylene terephthalate), is hereinafter abbreviated as 3GT. The relatively low glass transition temperature (Tg) of 3GT (~45–50° C.) can lead to slight tackiness of the polymer when stored at high temperatures. An instance of this is sometimes evidenced on spools of fiber stored in warehouses in the hot weather of tropical countries. An increase in Tg lowers tack. Additionally, the low Tg leads to instability in spun fibers when stored under hot conditions. Partially drawn fibers under such storage conditions tend to undergo crystallization, forming a denser phase and causing fiber shrinkage, changes in denier and other undesirable changes in physical properties on storage. However, esterification of isosorbide with terephthalic acid or transesterification with dialkyl terephthalates involves the reaction of secondary hydroxyls and is slow compared with reaction of primary glycols such as ethylene glycol or 1,3-propylene glycol. This tends to lead to inefficient incorporation of the isosorbide. Using conventional condensation polymerization, this lower reactivity can lead to final polyesters that have lower molecular weights since unreacted isosorbides are detrimental to subsequent polymerization.

There are limits to the extent the esterification or transesterification reactions of isosorbide with terephthalic acid or its esters can be driven by higher reaction temperatures, since any resulting degradation or significant color formation in the product polyester is undesirable. Additionally, polyesters formed from 1,3-propane diol can form acrolein if the polymerization temperatures are too high.

Adelman et al. U.S. Ser. No. 10/172112 have described process improvements for the preparation of poly(1,3-propylene-co-isosorbide)terephthalate, hereinafter abbreviated as 3GIT. However, the secondary hydroxyl groups of the isosorbide with the dibasic acid or its dialkyl ester have much lower reactivity than the corresponding reactivity of the primary hydroxyl groups of the 1,3-propane diol. This difference in reactivity has a number of effects, one of which is to lengthen the time needed for the solid phase polymerization step, a final procedure wherein the inherent viscosity of the polymer increased to about 1.1 dl/g for good spinning properties.

It is desirable to prepare 3GITs with a low level of color and a Tg higher than the 45–50° C. Tg of 3GT, and, most importantly, both a low level of color and a higher Tg. Such improved properties aid in the use of 3GIT in many markets, including beverage bottles, film or sheet, fibers, monofilaments, and optical articles (e.g., compact discs or digital versatile discs). In many of these markets, aesthetics are important, and having a very low color resin is highly desirable.

The present invention provides readily prepared esters of dianhydrosugar alcohols and acids that are incorporated into poly(alkylene ester) polymers. These ester oligomers provide a facile process for the efficient incorporation of anhydrosugar alcohols into polyesters and the resulting polyesters are suitable for the manufacture of fibers, films, and engineering plastics with advantageous properties.

SUMMARY OF THE INVENTION

The present invention comprises poly(alkylene-co-dianhydrosugar ester) dicarboxylate polymers.

The present invention further comprises a polymer comprising the reaction product of alkylene diol, dicarboxylic acid, and a moiety of formula 1

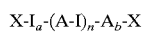  Formula 1 wherein:
A is the ester residue from an anhydrosugar alcohol or dianhydrosugar alcohol,
I is the ester residue from a diacid or its dialkyl esters,
X is H when linked to an A residue, OH when linked to an I residue derived from a dibasic acid, and OR when linked to an I residue derived from a dialkyl ester of the dibasic acid,
R is a C1–C4 straight or branched chain alkyl group,
a and b are independently 0 or 1, and
n is 1 to 10

The present invention further comprises an ester comprising formula 1

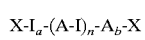  Formula 1 wherein:
A is the ester residue from an anhydrosugar alcohol or dianhydrosugar alcohol,
I is the ester residue from a diacid or its dialkyl esters,
X is H when linked to an A residue, OH when linked to an I residue derived from a dibasic acid, and OR when linked to an I residue derived from a dialkyl ester of the dibasic acid,
R is a C1–C4 straight or branched chain alkyl group,
a and b are independently 0 or 1, and
n is 1 to 10.

The present invention further comprises a process of incorporating a dianhydrosugar alcohol into a polyester comprising
A) contacting a dianhydrosugar alcohol with an acid to yield an ester, or contacting a dialkyl ester with a dianhydrosugar alcohol to yield an ester, and
B) polycondensing said ester with a polyalkylene ester oligomer.

DETAILED DESCRIPTION OF THE INVENTION

Trademarks are hereinafter shown in upper case.

The present invention comprises poly(alkylene-co-dianhydrosugar ester) dicarboxylate polymers having a Tg of at least about 50, preferably at least about 54. Preferred are poly(alkylene-co-dianhydrosugar ester) terephthalate polymers. The present invention also describes polymerization processes to incorporate dianhydrosugar diol-containing bridging moieties into polyester and co-polyester polymers, including for example poly(ethylene terephthalate), poly(trimethylene terephthalate), and poly(tetramethylene terephthalate), and poly(alkylene 1,4-cyclohexanedicarboxylate). The processes avoid the problems created by the slow reaction rate for direct esterification or transesterification of isosorbide with terephthalic acid or dimethylterephthlate. The process of the present invention, in comparison with the prior art, significantly improves the incorporation of dianhydrosugar alcohols into polyesters by preparing a preformed bridging moiety of Formula 1

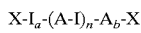

wherein:
- A is the ester residue from an anhydrosugar alcohol or dianhydrosugar alcohol,
- I is the ester residue from a diacid or its dialkyl esters,
- X is H when linked to an A residue, OH when linked to an I residue derived from a dibasic acid, and OR when linked to an I residue derived from a dialkyl ester of the dibasic acid,
- R is a C1–C4 straight or branched chain alkyl group,
- a and b are independently 0 or 1, and
- n is 1 to 10.

The ester residue from the diacid is the diacid with the hydroxyl groups removed. The ester residue from the alcohol is the alcohol with the hydrogens of the hydroxyl groups removed.

Formula 1 comprises esters of anhydrohexitols, such as the dianhydride isosorbide (1,4:3,6-dianhydrosorbitol) with dibasic acids such as isophthalic and phthalic acids, prepared by the esterification of the acid with the diol or by transesterification of the dialkyl ester of the diacid with the diol. Such esters are referred to hereinafter as "bridging moieties". The invention further comprises the composition of polyesters incorporating such bridging moieties into polyester polymers, and the process for incorporating such bridging moieties into said polyester polymers.

One example of the structure of the bridging moiety of Formula 1 prepared from isosorbide and isophthalic acid or dimethylisosphthalate, wherein a is 0, b is 0, and n is 1 to 10, has the structure of Formula II:

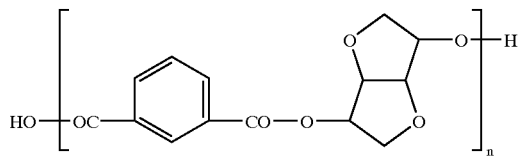

Formula II

The actual bridging moiety is typically a mixture of the above esters with n having a value of 1 to about 10, with the ester having n=1 predominating.

The bridging moiety shown in Formula II is prepared by the esterification of acid or the transesterification of dimethyl isophthalate with isosorbide, and then subjecting the preformed ester segment to polycondensation by adding it to a polyester oligomer such as 3GT. Prior to the polycondensation, the polyester oligomer used is pretreated by heating under vacuum, for instance at 0.1 to 2.0 mm Hg (13 to 267Pa), 200 to 260° C., for 10 to 60 minutes, to essentially remove free diol. The polyester/isosorbide/isophthalate copolymers obtained have a significantly higher Tg due to the resulting increased isosorbide content.

The diacid groups in the bridging moieties include, but are not limited to those derived from naphthalates, terephthalates, isophthalates, and benzoates. Specific examples of the diacid groups include isophthalic acid, phthalic acid, 2,5-furandicarboxylic acid, 2,5-thiophenedicarboxylic acid, 2,6-naphthalenedicarboxylic acid, 2,7-naphthalenedicarboxylic acid, 3,4'- and 4,4'-diphenyl ether dicarboxylic acid, 3,4'- and 4,4'-diphenyl sulfide dicarboxylic acid, 3,4'- and 4,4'-diphenylsulfone dicarboxylic acid, 3,4'- and 4,4'-benzophenonedicarboxylic acid, 1,4-naphthalenedicarboxylic acid, 4,4'-methylene bis (cyclohexyl) dicarboxylic acid, trans-1,4-cyclohexanedicarboxylic acid, cis-1,4-cyclohexanedicarboxylic acid, 1,2-bis(4-carboxyphenoxy) ethane, 4,4'-methylene-bis(benzoic) acid, trans-4,4'-stilbenedicarboxylic acid, fumaric acid, dimer acid, resorcinoldiacetic acid, and sulfoisophthalic acid, and 4,4'-bibenzoic acid. The diacid does not need to be derived from terephthalic acid or dimethyl terephthalate or from other compounds containing a terephthaloyl moiety. Small amounts of multifunctional acids or anhydrides may also be employed, e.g., 1,3,5-benzenetricarboxylic acid, pyromellitic acid and pyromellitic dianhydride. Further, by "aromatic" and "alicyclic", it is meant to include substituted aromatic or alicyclic compounds, e.g., aromatic compounds substituted with an aliphatic group. The preferred diacid moiety is isophthalic acid.

The anhydro or dianhydrosugar alcohols groups in the bridging moieties include, but are not limited to, isosorbide, 1,4:3,6-dianhydromannitol; 1,4:3,6-dianhydroiditol; and 1,4-anhydroerythritol. The preferred dianhydrosugar alcohol group is isosorbide.

The bridging moieties are prepared by heating the diacid and dianhydrosugar alcohol, in the presence of a catalyst. The procedure, here described for isophthalic acid and isosorbide, involves heating a 0 to 100 mole % excess of isosorbide, and preferably from about 20 to about 40 mole % excess of isosorbide, with isophthalic acid in the presence of about 90–140 micrograms/g tin in the form of a suitable catalyst, such as n-butylstannoic acid under an inert gas atmosphere. The temperature is from about 210 to about 290° C., and preferably from about 240 to about 260° C. Water is evolved. A clear solution is obtained after about 30 min. and heating is continued until no further water evolves, typically for about 1 to 2 hours, indicating the end of the esterification reaction.

Catalysts that may be used include salts of U, Ca, Mg, Zr, Mn, Zn, Pb, Sb, Sn, and Ti, such as acetate salts and oxides, including glycol adducts, and Ti alkoxides and chelates. These are generally known in the art, and the person of ordinary skill in the art can readily select the specific catalyst or combination or sequence of catalysts used. The preferred catalyst and preferred conditions are selected based on whether the diacid monomer is polymerized as the free diacid or as an alkyl ester or as a diacid chloride.

The preferred catalysts are Sb(III) salts; Ti(IV) salts; acetate salts of Co(II), Zn(II) or Sb(II); alkanoate salts of Co(II) or Sb(III); oxides of Sb(II), Sb(III) or Ge(IV); glycol-solubilized oxides of Sb(II), Ge(IV) or Sb(III); ortho titanate esters (preferably Ti(OR)$_4$ where R is an alkyl group having 2 to 12 carbon atoms, such as tetrabutyltitanate or tetraisopropyltitanate); solvent-based chelated organic titanates (e.g., TYZOR AA or TE catalysts (E.I. du Pont de Nemours and Company, Wilmington, Del.)); aqueous based chelated organic titanates (e.g., TYZOR LA catalyst (E.I. du Pont de Nemours and Company, Wilmington, Del.) or catalysts such as those described by Putzig, in U.S. Pat. No. 6,166,170; ortho zirconate esters (preferably $Zr(OR)_4$ is an alkyl group having 2 to 12 carbon atoms, such as tetra-n-propyl zirconate or tetra-n-butyl zirconate (E.I. du Pont de Nemours and Company)); solvent-based chelated organic zirconates; and aqueous-based chelated organic zirconates; and combinations thereof. Oxides of Ti are preferred. Oxides of Ge such as $GeO_2$ are less preferred since they tend to result in a slow increase in IV during the polycondensation stage. Most preferred are the solvent-based chelated organic titanates and aqueous based chelated organic titanates.

The preferred amount of polycondensation catalyst is generally from about 10 to 300 ppm, or more specifically the molar ratio of catalyst to terephthalic acid is about 1:1,000 to about 1:7,300, preferably at least about 1:2,200 and preferably up to about 1:4,400. A catalyst can also be used to enhance esterification or transesterification, and polycondensation catalysts are particularly useful in transesterification. The polycondensation catalysts described above also can be used to catalyze transesterification and can be present during direct esterification. Catalysts known in the art as useful in catalyzing esterification reactions, such as tin and zinc catalysts, can also be used. Catalysts can be added to the mixture and/or at any appropriate stage of the process.

Alternatively in a less preferred procedure, the bridging moieties are repared by heating the dialkyl ester of the diacid (e.g. dimethyl isophthalate) with the dianhydrosugar alcohol (e.g., isosorbide), under an inert gas atmosphere, in the presence of about 50 micrograms/g titanium as tetraisopropyl titanate (available as TYZOR TPT, a tetraisopropyl titanate available from E.I. du Pont de Nemours and Company Del.), based on the weight of the dialkyl isophthalate. Other Ti catalysts are those as described herein.

The molar ratio of dianhydrosugar alcohol:dialkylester is preferably about 1.4:1. The stirred mixture is heated to about 250° C. under a nitrogen purge, when alcohol (methanol in the specific case where dimethylisophthalate is used) starts to evolve. Heating and stirring at about 250° C. is continued until no more alcohol evolves (typically for about 2 more hours), indicating completion of the transesterification reaction.

In both the diacid and dialkyl ester routes, unreacted isosorbide can be immediately removed by heating under vacuum (see below) if desired, but typically this is preferably removed during the subsequent polycondensation.

The bridging moiety formed as above is then subjected to polycondensation by mixing a poly(alkylene ester) prepolymer with from about 0.5 to about 50%, preferably from about 2 to about 20%, and most preferably from about 4 to about 10% of the bridging moiety, based on the weight of the poly(alkylene ester) prepolymer. The poly(alkylene ester) prepolymer is preferably poly(alkylene terephthalate) prepolymer. The poly(alkylene terephthalate) prepolymer has an inherent viscosity in the range of from about 0.02 to about 0.6 dl/g. The poly(alkylene terephthalate) prepolymer is preferably poly(1,3-propylene terephthalate) oligomer. It is important that polyester prepolymers contain less than 1% by weight, as measured by NMR, of unreacted diol, since such unreacted diol interferes with the transesterification processes occurring during polycondensation. Unreacted diol can be removed by vacuum stripping. Catalyst, in the form of an alkyl titanate, in the amount of from about 10 to about 200, preferably from about 20 to about 100, and most preferably from about 30 to about 60 micrograms/g of titanium, based on the weight of the prepolymer/bridging moiety mix. Under an inert gas atmosphere, the mixture is heated molten at about 210–290° C., and preferably about 240–260° C., and a pressure of less than about 0.4 mm Hg (0.05 kPa) until the intrinsic viscosity (IV) reaches at least about 0.8 dl/g, typically for 1 to 2 hours. Unreacted isosorbide is removed during the vacuum heating. The composition of the product polymer typically varies from the composition of the charged ingredients.

Unreacted isosorbide is minimized for the solid phase polymerization step, as described above. During the polycondensation step, performed on the molten sample, the intrinsic viscosity (and molecular weight) increase to a maximum equilibrium level.

The poly(alkylene-co-dianhydrosugar ester) dicarboxylates of the present invention have a glass transition temperature, Tg, of at least 50, preferably at least about 54; and more preferably at least about 60. This higher Tg results in less tackiness of the polymer when stored at high temperatures. The higher Tg, in combination with incorporation of higher levels of dianhydrosugar alcohol using the process of the present invention, provide increased stability in fibers prepared from the polymers of the present invention.

Preferred poly(alkylene-co-dianhydrosugar ester) dicarboxylates of the present invention include poly(ethylene-co-isosorbide isophthalate) terephthalate, poly(trimethylene-co-isosorbide isophthalate) terephthalate, and poly (tetramethylene-co-isosorbide isophthalate) terephthalate.

The color of the poly(alkylene-co-dianhydrosugar ester) dicarboxylate products of the present invention is improved using coloring agents, preferably dyes and/or pigments. Color is commonly expressed in terms of Hunter numbers which correspond to the lightness or darkness ("L*") of a sample, the color value ("a*") on a red-green scale, and the color value ("b*") on a yellow-blue scale, and which are measured as described below. It is usually desired to produce polymers with "L*" at least 70, preferably at least about 80 and most preferably at least about 90, and up to 100. Similarly, for low color polymers, "a*" and "b*" are preferably less than about 2.0 to about −2.0, and more preferably less than about 1.5, and more preferably to about −1.5. It has been found that these objectives can be met for the polycondensed final polymers of the present invention with the use of color-correcting additives and by controlling critical process parameters at each stage of the process, especially temperature and pressure. The dyes and pigments range from blue through red. Any suitable coloring agent can be used alone or in combination. The dyes and pigments are preferably chosen from the group consisting of cobalt acetate, HS-325 SANDOPLAST Red BB, HS-510 SANDOPLAST Blue 2B, POLYSYNTHREN Blue R, and CLARIANT RSB violet. HS-325 SANDOPLAST Red BB, HS-510 SANDOPLAST Blue 2B, POLYSYNTHREN Blue R, and CLARIANT RSB violet are available from Clariant Corporation (Coventry, R.I.).

For low color product, especially 3GIT, it is also important to eliminate, or at least minimize, the colorforming impurities present in the moiety starting materials. Preferably, the UV absorbance of 1,3-propanediol and isosorbide are less than about 0.20 at 220 nm, more preferably less than about 0.10.

The polymers of the present invention further comprise additives selected from the group consisting of infrared absorbing agents, coloring agents, dyes, pigments, delustrants, flame retardants and UV stabilizers. These additives can be added at any time including when the polymer is produced into shaped articles or other products. One preferred alternative is to add the infrared absorbing agents, coloring agents, dyes, pigments, delustrants, flame retardants and/or UV stabilizers to the process after removal of at least 80% of the water derived from the condensation of acid with the diol and dianhydrosugar alcohol. The infrared absorbing agent is preferably graphite or carbon black.

After the polycondensation step, measurements on the resulting polymer compared with a control sample not containing any dianhydrosugar alcohol moiety showed its incorporation provided a higher glass transition temperature ($T_g$) and higher cold crystallization temperature ($T_{cc}$) providing significant value for several end-use applications in fibers, films, surfaces, and engineering thermoplastic components.

Analytical measurements show that the process of the present invention prepares copolymers containing dianhydrosugar alcohol groups, such as isosorbide and isophthaloyl units, with high molecular weights and good color. Both the glass transition temperature ($T_g$) and cold crystallization temperature ($T_{cc}$) increase with the increase of isosorbide and isophthaloyl units in the polymer.

The intrinsic viscosity of the polycondensed polymer product is from about 0.5 to about 2.5 dl/g. An intrinsic viscosity of less than about 0.8 dl/g is too low for optimum properties for fabrication of some final products, such as spun fibers. Consequently, for such products the polycondensation product having a low IV is preferably then subjected to solid phase polymerization in an oven at a temperature about 20° C. below the melting point (at about 190° C.) in a vacuum oven at a vacuum of about 300 mm Hg (39 kPa) under a slow nitrogen stream. This further raises the intrinsic viscosity to 0.9 to 1.0 as needed for subsequent spinning of fibers. The timing to complete solid phase polymerization varies with reactors, temperature, and pressure. The specific temperature is based on the melting point of the polycondensed product. At or below a final IV of about 0.85, the polymer shows poor fiber properties. A final IV of about 1.2 or above creates processing and spinning problems.

In other embodiments of the present invention, the bridging moieties can be subjected to polycondensation with other polyester oligomers, including but not limited to poly(ethylene terephthalate), poly(tetramethylene terephthalate), poly(alkylene 1,4-cyclohexanedicarboxylate) and similar oligomers.

The poly(alkylene-codianhydrosugar ester) dicarboxylate polymers of the present invention optionally further comprise up to about 30% by weight of a copolymer. Thus, the polymers comprise at least 70 mole % of the poly(alkylene-co-dianhydrosugar ester) dicarboxylate repeating units and up to 30 mole % of repeating units of other homopolymers or copolyesters. The poly(alkylene-co-dianhydrosugar ester) dicarboxylate compositions of the present invention contain three monomers, the alkylene diol, the anhydrosugar alcohol ester, and dicarboxylate acid. In another embodiment, copolymers may include copolyesters made using 4 or more reactants, each having 2 ester forming groups. For example, a copoly[(alkylene-co-dianhydrosugar ester) dicarboxylate] can be used in which the comonomer used to make the copolyester is selected from the group consisting of linear, cyclic, and branched aliphatic dicarboxylic acids having 4–12 carbon atoms (for example, butanedioic acid, pentanedioic acid, hexanedioic acid, dodecanedioic acid, and 1,4-cyclo-hexanedicarboxylic acid); aromatic dicarboxylic acids other than terephthalic acid and having 8–12 carbon atoms (for example, isophthalic acid and 2,6-naphthalenedicarboxylic acid); linear, cyclic, and branched aliphatic diols having 2–8 carbon atoms (other than 1,3-propanediol, for example, ethanediol, 1,2-propanediol, 1,4-butanediol, 3-methyl-1,5-pentanediol, 2,2-dimethyl-1,3-propanediol, 2-methyl-1,3-propanediol, and 1,4-cyclohexanediol); and aliphatic and aromatic ether glycols having 4–10 carbon atoms (for example, hydroquinone bis(2-hydroxyethyl) ether, or a poly(ethylene ether) glycol having a molecular weight below about 460, including diethyleneether glycol). The comonomer typically is present in the copolyester at a level in the range of about 0.5–about 15 mole %, and can be present in amounts up to 30 mole %.

In yet another embodiment, the poly(alkylene-co-dianhydrosugar ester) dicarboxylate can be blended with up to 30 mole percent of other polymers. Examples are polyesters prepared from other diols, such as those described above. The preferred poly(alkylene-co-dianhydrosugar ester) dicarboxylate contain at least 85 mole %, more preferably at least 90 mole %, even more preferably at least 95 or at least 98 mole %, and most preferably about 100 mole %, poly(alkylene-co-dianhydrosugar ester) dicarboxylate polymer.

The final poly(alkylene-co-dianhydrosugar ester) dicarboxylate polymers of the present invention produced by the polycondensation of the bridging moieties with polyester prepolymers, are useful as one of the starting materials in the manufacture of fibers having increased stability, in the manufacture of thermoplastics, shaped articles by injection molding, blow molding, extrusion and compression molding, and reactive extrusion in the manufacture of coatings, laminates and adhesives, in the manufacture of packaging and industrial films, in the manufacture of other meft processable products such as polyurethane, polyetheramide, and polyurethane urea fibers, and in the manufacture of foams and cast elastomers.

TEST METHODS

Test Method 1. Differential Scanning Calorimeter (DSC) and Crystallization Measurements:

Melting point, crystallization temperature and glass transition temperature were determined using the procedure of the American Society for Testing Materials ASTM D-3418 (1988) using a DuPont DSC Instrument Model 2100 (Wilmington Del.), used according to the manufacturer's instructions. The heating and cooling rates were 10° C. per min.

The crystallization temperature range was determined by heating each sample from 0° C. to 250° C. and allowing the sample to cool to ambient temperature. From the DSC scans, the Tg, crystallization temperature Tc, melting point Tm, and cold crystallization temperature Tcc, were determined and are shown in Table 1.

Test Method 2. Intrinsic Viscosity

Intrinsic viscosity was determined by measuring the flow time of a solution of known polymer concentration and the flow time of the polymer solvent in a capillary viscometer, as set forth in ASTM D2857.95.

Test Method 3. Color and Brightness

Hunter color lab measurements were made according to the American Society for Testing Materials (ASTM) Method D-2244.

The color and brightness of the 3GIT samples were determined using a Varian (Palo Alto Calif.) Cary 5 UV/Vis/NIR spectrophotometer with a diffuse reflectance accessory. The reflectance data was processed using the color analysis application within Grams/32 software with an observer angle of 2 degrees and a CIE A light source. Hunter L*, a*, and b* were calculated. The L* coordinate indicated brightness, where 0 was black and 100 was white. The a* value could be positive or negative, where positive values were indicative of red color and negative indicated green. The b* value was similar, where positive values indicated yellow and negative values indicated blue.

EXAMPLES

The following examples are presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Isophthalic acid was obtained from Aldrich, Milwaukee Wis. Isosorbide was obtained from Roquette Freres (Lestrem, France).

The trimethylene terephthalate prepolymer was prepared as described by Kurian et al. in U.S. Pat. No. 6,255,442.

n-Butylstannoic acid was obtained from Aldrich, Milwaukee Wis.

TYZOR catalysts were obtained from E.I. du Pont de Nemours and Company, Wilmington Del.

Example 1

A 250-mL round bottom flask, equipped with a stirrer, nitrogen sweep, a vacuum connection, a device for collecting distillates, and means for heating and stirring, was charged with 66.5 g of isophthalic acid (IPA), 80 g of isosorbide and 14 mg of n-butylstannoic acid (corresponding to 90 microgram/g tin based on final polymer). The molar ratio of isosorbide:IPA was 1.4:1. The flask was then purged with nitrogen and the contents of the flask were heated with stirring. The temperature was raised to 250° C. and held there for about 20 minutes, when water started to evolve. After about 30 minutes at 250° C., a clear solution was reached. Stirring continued at 250° C. for about another 1.5 hours until no more water evolves indicating the end of esterification reaction.

A sample of the bridging moiety (11 g), prepared as above, was subjected to polycondensation by mixing with 75 g of bis(3-hydroxypropyl) terephthalate, prepared as in Comparative Example A described below, and 15 mg TYZOR TPT tetraisopropyl titanate catalyst in a 250-mL flask under nitrogen and heated at a temperature of 250° C. and a pressure of 0.3 mm Hg (40 Pa) for 2 hours. The obtained polymer had an intrinsic viscosity of 0.838 dl/g. Based on the charged materials, the composition for this copolymer is about 10 mol % each of isosorbide and isophthaloyl moieties. Physical properties are shown in Table 1.

A sample of the polycondensed polymer, prepared as above, was placed in an oven under a pressure of about 300 mm Hg (39 kPa) and heated at a temperature of 190° C. (20° C. below its melting point) overnight (16 hours) under a slow nitrogen bleed. The intrinsic viscosity increased from 0.838 to 1.03 dl/g.

Examples 2 and 3

Bridging moieties in the amounts of 5.5 g (Example 2) and 22 g (Example 3), each were prepared as in Example 1, were polycondensed as in Example 1 to provide copolymers containing about 5 and 20 mole % each of isosorbide and isophthaloyl moieties. Physical properties are shown in Table 1.

Example 4

A sample of the bridging moiety (11 g), prepared in Example 1, was subjected to polycondensation by adding to 75 g of poly(trimethylene terephthalate) which had been under vacuum at 250° C. for 30 minute with additional 15 mg TYZOR TPT tetraisopropyl titanate catalyst in a 250-mL flask. Performed polycondensation at a temperature of 250° C. and a pressure of 0.2 mm Hg (26 Pa) for 1.5 hours. The obtained polymer had an Tg of 61° C. Based on the charged materials, the composition for this copolymer is about 10 mol % each of isosorbide and isophthaloyl moieties. Physical properties are shown in Table 1.

Example 5

Bridging moiety in the amount of 5.5 g, prepared as in Example 1, was polycondensed as in Example 4 to provide copolymers containing about 5 mole % each of isosorbide and isophthaloyl moieties. Physical properties are shown in Table 1.

Example 6

A 250-mL round bottom flask, equipped with a stirrer, nitrogen sweep, a vacuum connection, a device for collecting distillates, and means for heating and stirring, was charged with 58.5 g of dimethyl isophthalate (DMI), 64 g of isosorbide and 25 mg of TYZOR TPT (corresponding to 50 microgram/g Ti based on final polymer). The molar ratio of isosorbide:DMI was 1.4:1. The flask was then purged with nitrogen and the contents of the flask were heated with stirring. The temperature was raised to 250° C. and methanol started to evolve. Stirring continued at 250° C. for 2 hours until no more methanol evolves, indicating the end of transesterification reaction.

The above bridging moiety ester in the amount of 5.5 g was polycondensed as in Example 4 to provide copolymers containing about 5 mole % each of isosorbide and isophthaloyl moieties. Physical properties are shown in Table 1.

Comparative Example A

This comparative example shows preparation of a 3GT polymer (i.e., without isosorbide) from dimethylterephthalate.

A 250 ml flask was charged with 58.5 g of dimethylterephthalate, 40 g of 1,3-propanediol for a mole ratio of 1,3-propanediol: DMT of 1.8:1, and 18.5 mg TYZOR TPT. The temperature was raised to 210° C. and held for 1.5 hours. Methanol generated was removed as a liquid condensate by distillation.

After evolution of methanol had ceased, the resulting moiety, bis(3-hydroxypropyl) terephthalate, was polymerized in the same flask at a temperature of 250° C. and a pressure of 0.2 mm Hg (26 Pa) for 2 hours. The obtained polymer had a Tg of 47.3° C. Physical properties are shown in Table 1.

The polymer was subjected to solid state polymerization as for the polymer of Example 1.

Comparative Example B

To a 2-L stirred stainless steel vessel was added 873.90 g dimethyl terephthalate, 367.08 g 1,3-propanediol, 149.94 g isosorbide, 0.75 mL Catalyst A, and 1.8 mL tetramethylammonium hydroxide aqueous solution (25 weight %). The batch temperature was increased to a maximum of 240° C. while methanol was removed through a column. When 288 g of condensate was removed, the reactor contents were taken down to 2.6 mm Hg (0.35 kPa) for polycondensation at a temperature of 250° C. The IV was measured as 0.50 dl/g and the Tg was 63.5° C. Hunter color values were: L*=78.5, a*=0.02, and b*=7.7. The isosorbide content was 5.07 mole % and the polymer had 0.07 mole % of di-1,3-propylene glycol.

TABLE 1

3GT Copolymers with Isosorbide

| Ex. | Composition (by charge) | Composition by NMR | $T_g$ (° C.) | $T_{oc}$ (° C.) | $T_m$ (° C.) | $T_c$ (° C.) | IV | Color |
|---|---|---|---|---|---|---|---|---|
| | | | Examples | | | | | |
| 1 | 3GT: 10 mol % isosorbide 10 mol % IPA | 3GT: 4.7 mol % isosorbide 11 mole % IPA | 51.8 | 96.8 | 209.4 | 141.1 | 0.838 | L = 68.6, a = 3, b = 5.3 |
| 2 | 3GT: 5 mol % isosorbide 5 mol % IPA | 3GT: 2.2 mol % isosorbide 6.5 mol % IPA | 49 | 82.6 | 219.9 | 172.3 | 0.884 | L = 71.4, a = 1.7, b = 4.1 |
| 3 | 3GT: 20 mol % isosorbide 20 mol % IPA | 3GT: 10.6 mol % isosorbide 20.3 mol % IPA | 59.9 | NA*** | 182.1 | NA*** | 0.673 | L = 54.8, a = 3.3, b = 5.3 |
| 4 | 3GT: 10 mol % isosorbide 10 mol % IPA | 3GT: 10 mol % isosorbide, 11 mol % IPA | 61 | 118.6 | 204.2 | NA*** | 0.735 | L = 58.4 a = 2.47 b = 4.2 |
| 5 | 3GT: 5 mol % isosorbide 5 mol % IPA | 3GT: 5.4 mol % isosorbide, 6.4 mol % IPA | 54.9 | 95.4 | 215.3 | 137.9 | 0.919 | L = 62.8 a = 2.25 b = 4.6 |
| 6** | 3GT: 5 mol % isosorbide 5 mol % DMI | 3GT: 5.4 mol % isosorbide, 5.8 mol % DMI | 54.7 | 91.5 | 215.6 | 139.2 | 0.81 | L = 68.5 a = 2.62 b = 5.0 |
| | | | Comparative Examples | | | | | |
| A | 3GT homopolymer | 3GT: homopolymer | 47.3 | 73.2 | 231.2 | 182.8 | 0.85 | L = 77 a = 0.22 b = 1.0 |
| B | 3GIT from isosorbide, 23 mol %, DMT, & 3G | 3GIT: 5.1 mol % isosorbide | 63.5 | — | — | — | 0.5 | L = 78.5 a = 0.02 b = 7.7 |

**Prepared from DMI (dimethylisophthalate).
***NA Not applicable, no peak found, polymer is too amorphous.

Table 1 shows the incorporation of isosorbide into 3GT polymer increased its Tg. Comparing to the prior art, Examples 4, 5 and 6 of this invention have the advantages of more isosorbide incorporation and easier process, such as shorter reaction time and higher IV. It also showed as in Example 4, 5 and 6 that the removal of free diol from 3GT polyester prepolymer prior to polycondensation significantly improved isosorbide incorporation compared to Examples 1 and 2. The examples of this invention showed higher IVs values compared to Comparative Example B prepared by reacting isosorbide with a dibasic acid instead of the ester-bridging moiety used in the present invention.

What is claimed is:

1. A polymer comprising poly(alkylene-co-dianhydrosugar ester) dicarboxylate.

2. The polymer of claim 1 comprising poly(alkylene-co-dianhydrosugar ester) terephthalate.

3. The polymer of claim 1 wherein the dianhydrosugar ester is an ester of a dianhydrosugar alcohol selected from the group consisting of 1,4:3,6-dianhydrosorbitol, 1,4:3,6-dianhydromannitol, 1,4:3,6-dianhydroiditol, and 1,4-dianhydroerythritol.

4. The polymer of claim 1 wherein the dianhydrosugar ester is prepared from a diacid selected from the group consisting of a phthalic acid, isophthalic acid, 2,6-naphthalenedicarboxylic acid, 2,7-naphthalenedicarboxylic acid, 3,4'- and 4,4'-diphenyl ether dicarboxylic acid, 3,4'- and 4,4'-diphenyl sulfide dicarboxylic acid, 3,4'- and 4,4'-diphenylsulfone dicarboxylic acid, 3,4'- and 4,4'-benzophenonedicarboxylic acid, 1,4-naphthalenedicarboxylic acid, 4,4'-methylene bis (cyclohexyl)dicarboxylic acid, trans-1,4-cyclohexanedicarboxylic acid, cis-1,4-cyclohexanedicarboxylic. acid, 1,2-bis(4-carboxyphenoxy) ethane, 4,4'-methylene-bis(benzoic) acid, trans-4,4'-stilbenedicarboxylic acid, fumaric acid, dimer acid, resorcinoldiacetic acid, sulfoisophthalic acid, and 4,4'-bibenzoic acid.

5. The polymer of claim 4 wherein the dianhydrosugar ester is isosorbide.

6. The polymer of claim 1 which is poly(trimethylene-co-isosorbide isophthalate)terephthalate.

7. The polymer of claim 1 which is poly(ethylene-co-isosorbide isophthalate)terephthalate.

8. The polymer of claim 1 which is poly(tetramethylene-co-isosorbide isophthalate)terephthalate.

9. The polymer of claim 1 further comprising a coloring agent, delustrant, dye, pigment, infrared absorbing agent, flame retardant, or a UV stabilizer.

10. The polymer of claim 1 having an IV of from about 0.5 to about 2.5.

11. The polymer of claim 1 further comprising up to about 30 mole percent of a copolymer.

12. The polymer of claim 1 having a Tg of at least about 54.

13. The polymer of claim 1 having a Tg of at least about 60.

14. A polymer comprising the reaction product of alkylene diol, dicarboxylic acid, and a moiety of formula 1

$$X\text{-}I_a\text{-}(A\text{-}I)_n\text{-}A_b\text{-}X \qquad \text{Formula 1}$$

wherein:

A is the ester residue from an anhydrosugar alcohol or dianhydrosugar alcohol,

I is the ester residue from a diacid or its dialkyl esters,

X is H when linked to an A residue, OH when linked to an

I residue derived from a dibasic acid, and OR when linked to an I residue derived from a dialkyl ester of the dibasic acid, R is a C1–C4 straight or branched chain alkyl group, a and b are independently 0 or 1, and n is 1 to 10.

15. A polymer of claim 14 further comprising up to about 30 mole percent of other polyesters.

16. A process of incorporating a dianhydrosugar alcohol into a polyester comprising C) contacting a dianhydrosugar alcohol with an acid to yield an ester, or contacting a dialkyl ester with a dianhydrosugar alcohol to yield an ester, and D) polycondensing said ester with a polyalkylene ester oligomer.

17. The process of claim 16 wherein the ester of step A is prepared by heating a molar excess of dianhydrosugar alcohol with a diacid in the presence of a catalyst.

18. The process of claim 16 wherein the ester of step A is prepared by heating a dialkyl ester and a dianhydrosugar alcohol in the presence of a catalyst.

19. The process of claim 16 wherein the polyalkylene ester oligomer is heated with from about 0.5% to about 50% of the ester at a temperature of from about 210° C. to about 290° C.

20. The process of claim 16 wherein the polyalkylene ester oligomer is polyalkylene terephthalate oligomer which contains less than about 1% by weight diol.

21. The process of claim 16 wherein the catalyst is a tin or titanate catalyst.

22. An ester comprising formula 1

$$X\text{-}I_a\text{-}(A\text{-}I)_n\text{-}A_b\text{-}X \qquad \text{Formula 1}$$

wherein:

A is the ester residue from an anhydrosugar alcohol or dianhydrosugar alcohol,

I is the ester residue from a diacid or its dialkyl esters,

X is H when linked to an A residue, OH when linked to an

I residue derived from a dibasic acid, and OR when linked to an I residue derived from a dialkyl ester of the dibasic acid, R is a C1–C4 straight or branched chain alkyl group, a and b are independently 0 or 1, and n is 1 to 10.

23. The ester of claim 22 wherein A is an ester residue of 1,4:3,6-dianhydrosorbitol, 1,4:3,6-dianhydromannitol, 1,4:3,6-dianhydroiditol, or 1,4-dianhydroerythritol.

24. The ester of claim 22 wherein A is an ester residue of an anhydrohexitol or dianhydrohexitol.

25. The ester of claim 22 wherein the diacid is selected from the group consisting of a phthalic acid, isophthalic acid, 2,6-naphthalenedicarboxylic acid, 2,7-naphthalenedicarboxylic acid, 3,4'- and 4,4'-diphenyl ether dicarboxylic acid, 3,4'- and 4,4'-diphenyl sulfide dicarboxylic acid, 3,4'- and 4,4'-diphenylsulfone dicarboxylic acid, 3,4'- and 4,4'-benzophenonedicarboxylic acid, 1,4-naphthalenedicarboxylic acid, 4,4'-methylene bis(cyclohexyl)dicarboxylic acid, trans-1,4-cyclohexanedicarboxylic acid, cis-1,4-cyclohexanedicarboxylic acid, 1,2-bis(4-carboxyphenoxy)ethane, 4,4'-methylene-bis(benzoic) acid, trans-4,4'-stilbenedicarboxylic acid, fumaric acid, dimer acid, resorcinoldiacetic acid, sulfoisophthalic acid, and 4,4'-bibenzoic acid.

26. The ester of claim 22 which is trimethylene-co-isosorbide isophthalate.

* * * * *